United States Patent
Sato

(10) Patent No.: US 6,366,839 B1
(45) Date of Patent: Apr. 2, 2002

(54) MONITORING FAULT IN CONTROL DEVICE CPU CONTAINING EXERCISE CALCULATING SECTION EXECUTING ON PROPOSED DATA TO PRODUCE MONITOR CONVERTED RESULT

(75) Inventor: Yoshinori Sato, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/347,466

(22) Filed: Jul. 6, 1999

(30) Foreign Application Priority Data

Jul. 13, 1998 (JP) ............................................. 10-196990

(51) Int. Cl.[7] ................................................. G05B 9/02
(52) U.S. Cl. .......................... 701/29; 701/33; 701/102; 701/107; 714/25; 714/31; 714/32
(58) Field of Search .......................... 701/62, 102, 107, 701/92, 29, 33; 714/25, 30, 31, 32

(56) References Cited

U.S. PATENT DOCUMENTS 4,933,941 A * 6/1990 Eckard et al. ................. 714/31
5,802,071 A * 9/1998 Fang et al. .................. 714/724
6,158,021 A * 12/2000 Ziegler et al. ................ 714/25
6,243,629 B1 * 6/2001 Sugimoto et al. ............. 701/29

* cited by examiner

Primary Examiner—Kenneth S. Kim
(74) Attorney, Agent, or Firm—McDermott, Will & Emery

(57) ABSTRACT

A central processing unit (CPU) monitoring system is provided for detecting abnormality in a CPU 1. In the CPU monitoring system, a proposal data is outputted from a proposing section 11 in a monitoring unit 10 to a converting section 12 of the unit 10 and an exercise calculating section 3 in the CPU 1. In the converting section 12, a designated converting operation is carried out to output an expected value data to two judging sections 13, 4 in the monitoring unit 10 and the CPU 1. When the expected value data does not coincide with the calculation result, it is judged at the sections 13, 4, that the CPU 1 has an abnormality, so that a fail-safe operation is performed to cut off the power supply for a motor 8. The converting section 12 has only to convert the proposal data into the expected value data simply. Consequently, even if the CPU 1 is subjected to modification in control specification, there is no need to change the contents of the CPU 1. Additionally, since it is not necessary for the monitoring unit 10 to have a calculating function identical to that of the CPU 1, the manufacturing cost of the system can be reduced.

7 Claims, 3 Drawing Sheets

FIG.3

```
101 MOV  @ADR_X, R0   ;X→R0
102 MOV  @ADR_A, R1   ;A→R1
103 MUL  R1,     R0   ;R0×R1→R0
104 MOV  @ADR_Y, R2   ;Y→R2
105 MOV  @ADR_B, R3   ;B→R3
106 MUL  R3,     R2   ;R2×R3→R2
107 SUB  R2,     R0   ;R0−R2→R0
```

FIG.4

```
201 MOV  @ADR_Z, R10  ;z→R10
202 MOV  R10,    R11  ;R10→R11
203 MUL  R11,    R10  ;R10×R11→R10(z×z=z²)
204 DIV  R11,    R10  ;R10÷R11→R10(z²÷z=z)
205 CLR  R12          ;R12 CLEAR
206 SUB  R10,    R12  ;R12−R10→R10(0−z=-z)
```

MONITORING FAULT IN CONTROL DEVICE CPU CONTAINING EXERCISE CALCULATING SECTION EXECUTING ON PROPOSED DATA TO PRODUCE MONITOR CONVERTED RESULT

BACKGROUND OF THE INVENTION

1. Field of the Invention

The present invention relates to a central processing unit (CPU) monitoring system for detecting an abnormality in a central processing unit installed in a control device.

2. Description of the Related Art

There is an earlier CPU monitoring system (not prior art) of a mutual monitoring type, which carries out the identical calculation by two central processing units and compares both calculation results with each other thereby to detect the abnormality in either one of the units.

FIG. 1 shows one example in which the above-mentioned CPU monitoring system is applied to a CPU for performing the throttle-valve control in an engine for a vehicle.

In the shown structure, a main-CPU 20 has a calculating section 21 which calculates a control value for the throttle opening by detection values on an acceleration pedal sensor 5 and a throttle position sensor 6 and outputs the control value to a drive circuit 7. The drive circuit 7 is provided for driving a motor 7 to adjust the opening of a not-shown throttle valve.

The control value resulting from the calculation at the calculating section 21 is further outputted to a judging section 22 and another judging section 25 of a sub-CPU 23.

Additionally, the detection values on the acceleration pedal sensor 5 and the throttle position sensor 6 are also brought into a calculating section 24 of the sub-CPU 23 in order to perform the calculating identical to that at the calculating section 21. The calculation result obtained by the calculating section 24 is outputted to both judging section 22 and judging section 25, too.

At each of the judging sections 22, 25, it is carried out to compare the control vale with the calculating result. In case of agreement between the control value and the calculating result, each judging section 22, 25 does output a signal of high level to an AND gate circuit 14. While, in case of disagreement, each judging section 22, 25 does output a signal of low level to the circuit 14.

Thus, only when the agreement are confirmed at both judging sections 22, 25, the AND gate circuit 14 generates the output signal of high level thereby to activate a transistor 16. Consequently, a relay 15 for supplying power to the motor 8 is so energized that the motor 8 can be controlled by the main-CPU 20.

On the contrary, if the incorrect calculation is performed at either main-CPU 20 or sub-CPU 23 due to the abnormality, the signals of low level are inputted from the judging sections 22, 25 since each control value is not identical to each calculation result.

Thus, the AND gate circuit 14 generates the output signal of low level thereby to inactivate the transistor 16. Consequently, the relay 15 for supplying power to the motor 8 is not energized, so that the power supply to the motor 8 is cut-off to prevent it from being controlled by the main-CPU 20.

In the above-mentioned CPU monitoring system, however, there is a problem of increasing the manufacturing cost since the sub-CPU also requires the calculating functions similar to those of the main CPU.

Furthermore, if the modification in specifications requires to modify the calculation program in the main-CPU, then it becomes necessary to change the calculation program in the sub-CPU, thereby causing the number of modifying steps for the modification to be increased.

SUMMARY OF THE INVENTION

It is therefore an object of the present invention to provide a central processing unit (CPU) monitoring system in which a monitoring unit has a simple structure and which makes it unnecessary to change the monitoring unit in case of changing the control specification required for the CPU, whereby the manufacturing cost of the system can be reduced.

According to the present invention, the above-mentioned object of the present invention can be accomplished by a CPU monitoring system comprising:

a CPU for executing a designated control program, the CPU including an exercise calculating section for carrying out a predetermined exercise program; and a monitoring unit for monitoring the operation of the CPU executing the designated control program;

wherein the monitoring unit outputs proposal data to the exercise calculating section of the CPU and further judges whether or not the CPU has an abnormality in the operation on the basis of calculation results obtained by the exercise calculating section processing the proposal data.

The above and other features and advantages of this invention will become apparent, and the invention itself will best be understood, from a study of the following description and appended claims, with reference to the attached drawings showing one preferred embodiment of the invention.

BRIEF DESCRIPTION OF THE DRAWINGS

FIG. 3 is an explanatory diagram showing a control program stored in a control section of the system of FIG. 2; and FIG. 4 is an explanatory diagram showing an exercise program stored in an exercise calculating section of the system of FIG. 2.

DESCRIPTION OF THE PREFERRED EMBODIMENT

Referring to the attached drawings, we now describe an embodiment of the present invention.

Figure 1:
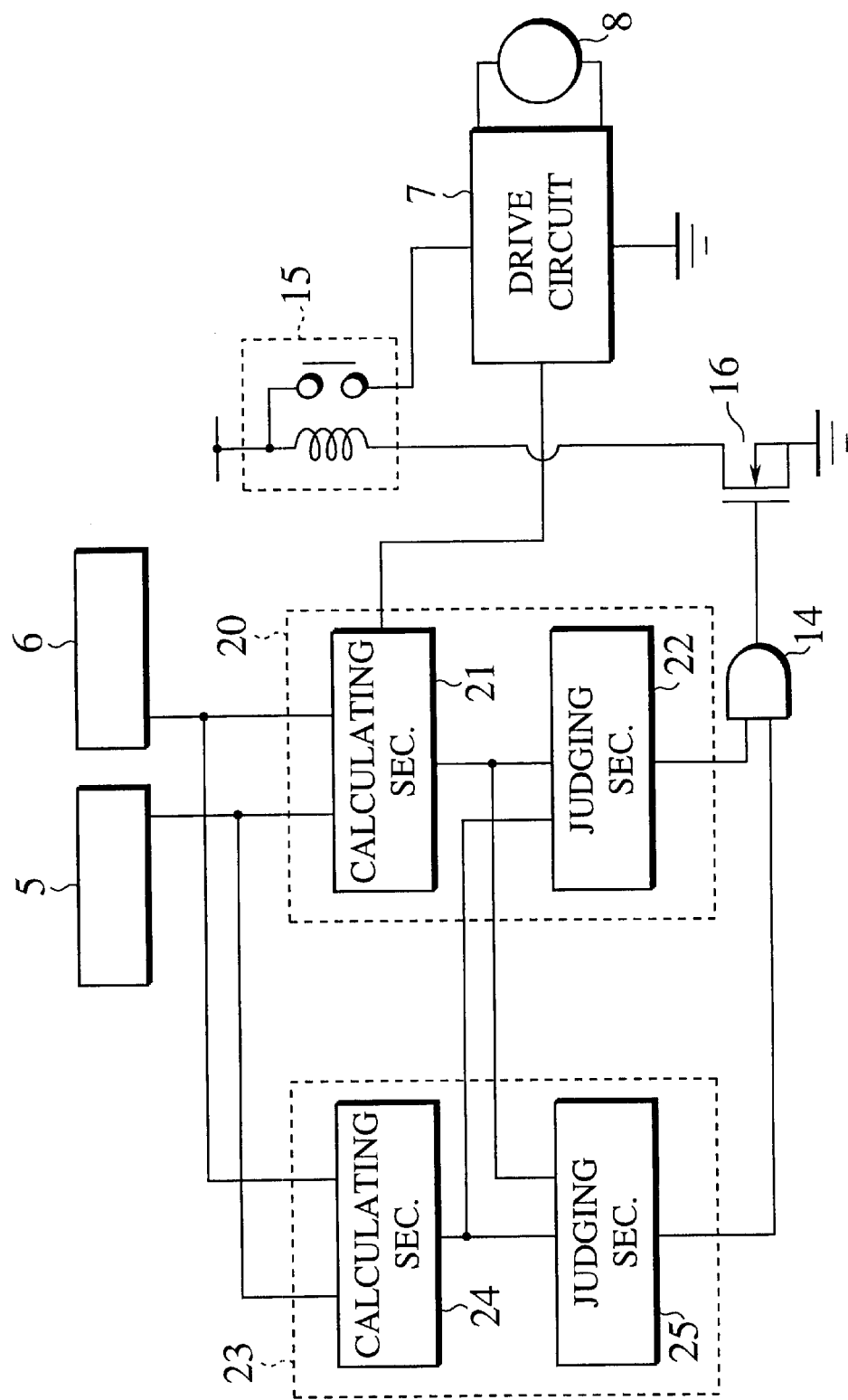
FIG. 1 is a schematic diagram showing a constitution of the earlier art CPU monitoring system.
Figure 2:
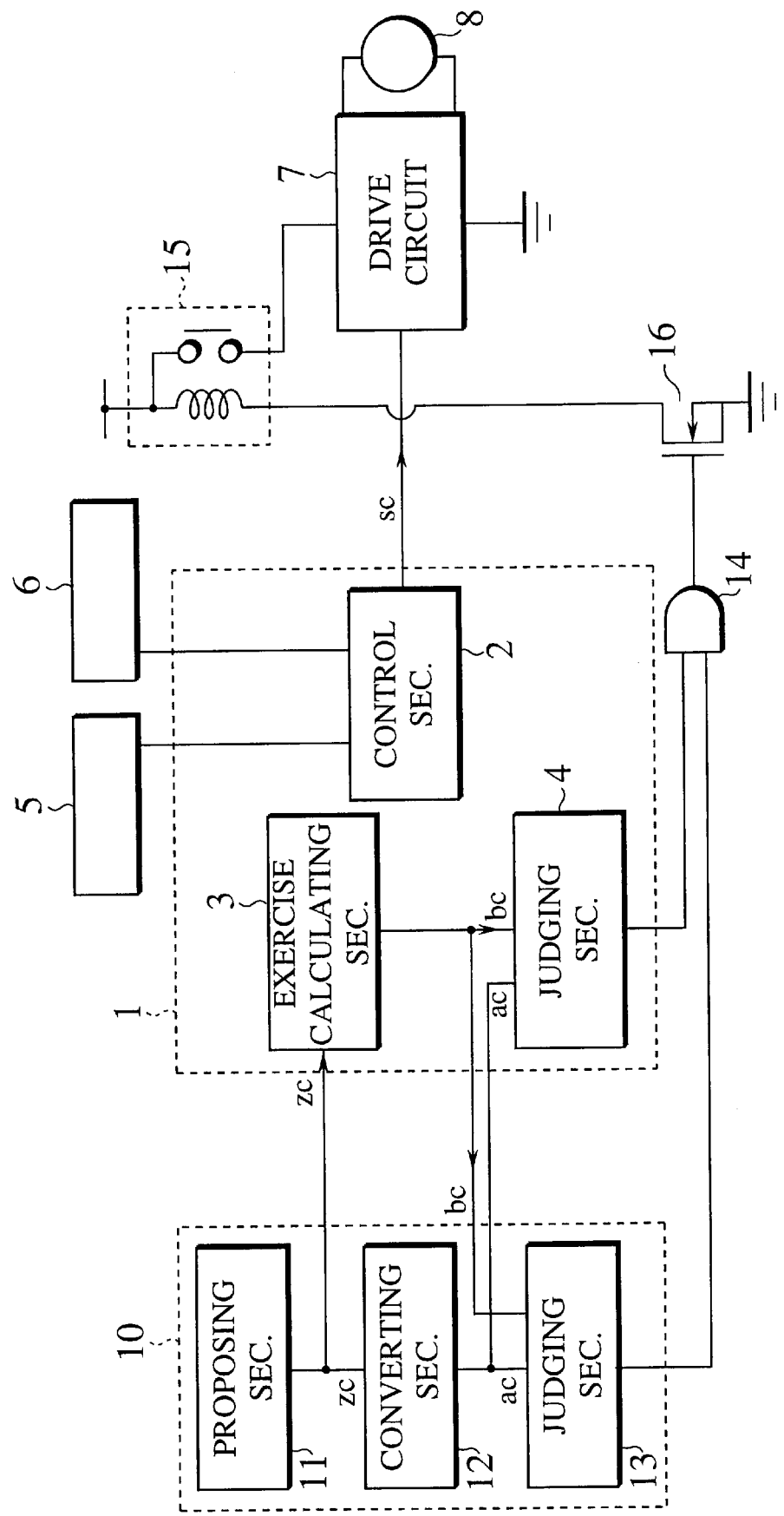
FIG. 2 is a schematic diagram showing a constitution of the CPU monitoring system in accordance with an embodiment of the present invention.

At first, we describe the whole constitution of the central processing unit (CPU) monitoring system of the embodiment with reference to FIG. 2. In the embodiment, the CPU monitoring system is applied to an electronically-controlled throttle system for a vehicle.

A CPU 1 comprises a control section 2 for controlling the opening degree of a throttle valve, an exercise calculating section 3 and a judging section 4 for confirming whether the CPU 1 operates normally in view of its function for command.

The control section 2 firstly calculates a target throttle opening by the signal inputted from an acceleration pedal sensor 5 and also calculates an actual throttle opening by the signal inputted from a throttle position sensor 6. Then, the section 2 further calculates a throttle control signal sc from a difference between the target throttle opening and the actual throttle opening and outputs the signal sc to a drive circuit 7.

The drive circuit 8 controls the operation of a motor 8 in order to control a not-shown throttle valve.

The details of both exercise calculating section 3 and judging section 4 will be described later.

A monitoring unit 10 has a proposing section 11 for producing proposal data for a problem, a converting section 12 for processing the proposal data and a judging section 13 for judging the occurrence of abnormality.

The proposing section 11 is connected with the converting section 12 and the exercise calculating section 3 in the CPU 1 and has a value z as the proposal data zc stored in a resister.

The converting section 12 converts the proposal data zc into an expected value data ac to output it to both judging section 13 and judging section 4 of the CPU 1. When the converting section 12 operates normally, the expected value data ac is established to be a value of −z.

The exercise calculating section 3 in the CPU 1 calculates the proposal data zc outputted from the proposing section 11 of the monitoring unit 10 in accordance with an exercise program and sequentially outputs the calculation result bc to both judging sections 4 and judging section 13 of the monitoring unit 10.

The exercise program, which involves all commands for allowing the CPU 1 to control the throttle valve, is previously established in a manner that if all commands are carried out normally, a value −z for the calculation result bc can be obtained in case of a value z for the proposal data zc.

At both of the judging sections 4 and 13, it is executed to compare the expected value data ac with the calculation result bc. When the former data coincides with the latter result, then the high-leveled signal is outputted to the AND gate circuit 14. While, if not, the low-leveled signal is outputted to the AND gate circuit 14.

The AND gate circuit 14 is connected with a gate of the transistor 16 which controls the ON/OFF state at the relay 15 through which the power is supplied to the drive circuit 7.

Note, the judging section 13 of the embodiment constitutes a first judging unit of the invention, while the judging section 4 of the embodiment constitutes a second judging unit of the invention. Further, the AND gate circuit 14 and the transistor 16 both constitute a fail-safe unit of the present invention.

Next, the CPU monitoring system of the invention operates as follows. First of all, we now describe the normal operation of the system when the CPU 1 operates in normality.

When the operations of the CPU 1 and the monitoring unit 10 are started, the proposal data zc, i.e., the value z is outputted from the proposing section 11 of the monitoring unit 10 into the converting section 12 and the exercise calculating section 3 of the CPU 1.

At the converting section 12, it is executed to convert the proposal date zc and output the value −z for the expected vale data ac to both judging sections 13 and 4.

Inputted to the control section 2 of the CPU 1 are a stepping amount X which is also detected by the accelerating pedal sensor 5 and a throttle opening degree Y which is detected by the throttle position sensor 6. Thereafter, the control section 2 calculates the throttle control signal sc so as to maintain a difference between A·X and B·Y (A, B: both coefficients) to be a predetermined value.

The throttle control signal sc is generated to the drive circuit 7 to adjust the opening of the throttle valve by means of the motor 8.

In order to accomplish the above-mentioned control, it is necessary to carry out an operation of A·X−B·Y at the control section 2.

We describe the program for carrying out the operation of A·X−B·Y with reference to FIG. 3. FIG. 3 shows the program using the assembler language.

Note, the coefficients A and B are constants which have been previously written in a ROM (read only memory) installed in the CPU 1 and which are stored in the addresses ADR-A and ADR-B, respectively.

Additionally, the amount of stepping X detected by the accelerating pedal sensor 5 is stored in the address ADR-X in a memory of the CPU 1, while the throttle opening Y detected by the throttle position sensor 6 is stored in the address ADR-Y At step 101, by a transmitting command MOV, it is executed to transmit the value stored in the address ADR-X, that is, the stepping amount X to a general purpose register R0.

At next step 102, by the transmitting command MOV, it is executed to transmit the coefficient A stored in the address ADR-A to a general purpose register R1.

At next step 103, by a multiplying command MUL, it is executed to carry out multiplication of the value stored in the general purpose register R0 by the value stored in the general purpose register R1 and sequentially store the calculation result in the general purpose register R0. Therefore, the multiplication value AX resulting from the multiplication of the coefficient A by the stepping amount X is stored in the general purpose register R0.

Similarly, at step 104, it is executed to transmit the throttle opening Y from the address ADR-Y to a general purpose register R2. At next step 105, it is executed to transmit the coefficient B from the address ADR-B to a general purpose register R3. At next step 106, it is executed to calculate the multiplication value BY resulting from the multiplication of the coefficient B by the throttle opening Y and store the value BY in the general purpose stepping amount X At next step 107, by a subtracting command SUB, it is executed to subtract the multiplication value BY stored in the general purpose register R2 from the multiplication value AX stored in the general purpose register R0 and sequentially store the calculation result in the general purpose register R0.

In this way, the calculation result A·X−B·Y is stored in the general purpose register R0 by the above-mentioned steps.

The control section 2 outputs the calculation result A·X−B·Y in the form of the throttle control signal sc thereby to control the operation of the motor 8 through the drive circuit 7.

While, in parallel with the above control operation, the exercise calculating section 3 carries out the program shown in FIG. 4. As well as the program of FIG. 3, the program of FIG. 4 is written by the assembler language.

Note, the value z of the proposal data zc is a constant which has been previously written in the ROM of the CPU 1 by the proposing section 11 and stored in the addresses ADR-Z.

At step 201, by the transmitting command MOV, it is executed to transmit the value z stored in the address ADR-Z to the general purpose register R0.

At next step 202, by the transmitting command MOV, it is executed to transmit the value z stored in the general purpose register R0 to the general purpose register R11.

At next step 203, by the multiplying command MUL, it is executed to carry out multiplication of the value stored in the general purpose register R10 by the value stored in the general purpose register R11 and sequentially store the calculation result in the general purpose register R10. Therefore, the multiplication value $z^2$ is stored in the general purpose register R10.

At next step 204, by a dividing command DIV, it is executed to divide the value in the general purpose resister R10 by the value in the general purpose resister R11 and sequentially store the calculation result in the general purpose register R10. Thus, the general purpose register R10 has the value z stored therein.

At step 205, it is executed to clear the general purpose register R12 by a clear command CLR.

At next step 206, by the subtracting command SUB, it is executed to subtract the value in the general purpose resister R10 from the value in the general purpose resister R12 and store the calculation result in the resister R10. Accordingly, the general purpose resister R10 has the value of −z stored therein.

The exercise calculating section 3 outputs the value −z stored as the calculation result bc in the general purpose resister R10 to both of the judging section 4 and the judging section 13.

At each of the judging sections 4 and 13, it is carried out to compare the expected value data ac converted at the converting section 12 with the calculation result bc calculated by the exercise calculating section 3.

Since both values are equal to −z coincidentally, the respective outputs of the judging sections 4 and 13 exhibit the signals of high-level, respectively.

Therefore, the output of the AND gate circuit 14 exhibits the high-leveled signal, so that the transistor 16 is turned on and successively, the relay 15 is activated to supply the electric power to the motor 8 through the drive circuit 7, whereby the motor 8 is controlled by the control section 2.

We further describe the operation of the system when the multiplying command MUL is not executed normally due to in not executed normally due to any trouble caused in the CPU 1.

In the monitoring unit 10, the expected value data ac resulting from the conversion of the proposal data zc, that is, the value −z is generated from the converting section 12 to the judging sections 4, 13, as similar to the normal operation of the system.

In the exercise calculating section 3 in the CPU 1, the calculation result bc is obtained from the proposal data zc and outputted to the judging sections 4, 13. In this case, however, the calculation result bc is not the value −z since the multiplying command MUL is not executed normally.

Therefore, the low-leveled signals are outputted from both judging sections 4, 13 because the expected value data ac is not identical to the calculation result bc.

Then, the output of the AND gate circuit 14 exhibits the low-leveled signal, so that the transistor 16 is turned off and successively, the relay 15 is inactivated to cut off the electric power to the motor 8. Thus, the motor 8 can be prevented from being controlled by the CPU 1 being out of order.

That is, when it is judged at the judging sections 4, 13 that the CPU 1 is out of order, there is performed a so-called "fail-safe operation" to prohibit the control for the motor 8 directing the throttle opening.

As mentioned above, according to the embodiment, there is no need for the converting section 12 to carry out the program identical to the exercise program, so that the section 12 has only to perform such a simple operation to convert the proposal data into the expected vale data.

Thus, it is unnecessary for the monitoring unit 10 to possess the similar calculating function to that of CPU 1, thereby allowing the using of cheap and low-functional CPU, custom IC (integrated circuit), or the like. Consequently, it is possible to attain the reduction in manufacturing cost of the CPU monitoring system.

Additionally, although the above-mentioned exercise program of FIG. 4 includes all of the commands employed in the control program of FIG. 3 and employs neither X nor Y as the sensor signal and also neither A nor B as the constant for control.

Thus, even if the modification in specification causes the treatment for the sensor signal and the control constants to be altered, there is no need to change the converting section 12 of the monitoring unit 10, the exercise program in the exercise calculating section 3 of the CPU 1, or the like, whereby the cost in modifying the specification can be reduced.

Furthermore, according to the embodiment, the monitoring unit 10 and the CPU 1 are respectively provided with the judging sections each of which compares the calculation result with the expected value data and further judges the occurrence of abnormality in case of their disagreement. Therefore, if the abnormality is caused in either CPU 1 or monitoring unit 10, it is possible to detect the abnormality, whereby the reliability of the CPU monitoring system can be improved.

Although the invention has been described above by reference to an embodiment of the invention, the invention is not limited to the embodiment described above. Modifications and variations of the embodiment described above will occur to those skilled in the art, in light of the above teachings.

For example, although the monitoring unit 10 and the CPU 1 are respectively provided with the judging sections in the embodiment, they may be replaced with the single judging section on condition that it could detect the abnormality in CPU. In such a case, the reliability in the CPU monitoring unit would be improved.

Additionally, although the program containing the commands involved in the control operation is being employed as the exercise program, the invention is not limited to the embodiment. For example, if adopting a program only containing a command to exert a great influence on the control operation in case of the abnormality in operation, then it is possible to simplify the structure of the exercise program.

Alternatively, if a program contains all commands which can be used in the CPU 1 is employed for the exercise, it will be unnecessary to alter the exercise program in modifying the control specification.

Further, although the converting section 12 converts the proposal data value z into −z in the embodiment, the invention is not limited to the embodiment and any element will do so long as it automatically determines the output for the input. If using such a simple circuit as an inverted circuit, then the reduction in manufacturing cost is further progressed.

Again, if the exercise program is constructed so as to provide a value of the proposal data as the calculation result, then the detection of abnormality in the CPU can be accomplished by direct-outputting the proposal data to both judging sections 13, 4 while deleting the converting section 12, whereby the circuit can be further simplified.

The entire contents of the Japanese Patent Applications P10-196990 (filed Jul. 13, 1998) is incorporated herein by reference.

The scope of the invention is defined with reference to the following claims.

What is claimed is:

1. A central processing unit monitoring system comprising:
    a central processing unit including:
    a controller configured to execute a designated control program, an exercise calculating section configured to carry out an exercise program with proposal data to output a calculation result, and
        a second judging section configured to judge that the central processing unit has an abnormality in an operation by comparing the calculation result from the exercise calculating section with an expected value data; and
    a monitoring unit including:
    a proposing section configured to output the proposal data, a converting section configured to convert the proposal data in accordance with a predetermined converting rule and output the conversion result as the expected value data, and
    a first judging section configured to judge that the central processing unit has an abnormality in the operation by comparing the calculation result of the exercise calculating section with the expected value data.

2. A central processing unit monitoring system of claim 1, further comprising a circuit configured to judge the central processing unit has an abnormality by inputting signals from the first and second judging sections.

3. The central processing unit monitoring system of claim 1 wherein the exercise program is constructed in a manner that the calculation result in case of executing a calculating operation using the proposal data is identical to the expected value data.

4. The central processing unit monitoring system of claim 1, wherein the exercise program is a program where any input values inputted from the outside are not adopted except the proposal data.

5. The central processing unit monitoring system of claim 1, wherein the exercise program is a program using all commands which are used in the designated control program.

6. The central processing unit monitoring system of claim 1, wherein the exercise program is a program using all commands which are used in the central processing unit.

7. The central processing unit monitoring system of claim 1, further comprising a fail-safe section which prohibits the control operation of the central processing unit against an object to be controlled and further fixed the operation of the object on its safety side when it is judged at either first judging section or second judging section that the central processing unit has the abnormality in the operation.

* * * * *